Oct. 20, 1925.

H. M. SWEET 1,558,311

LINE DRIVE TRACTOR

Filed April 6, 1921

INVENTOR
Howard M. Sweet.

BY his ATTORNEY

Oct. 20, 1925.
H. M. SWEET
1,558,311
LINE DRIVE TRACTOR
Filed April 6, 1921
4 Sheets-Sheet 2
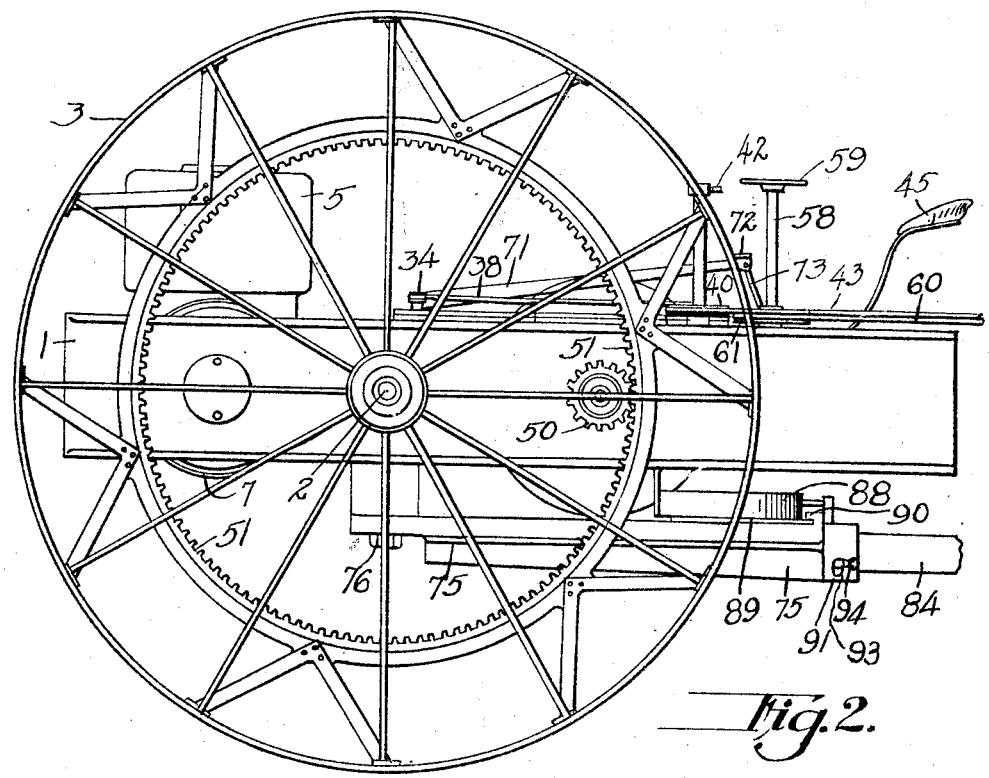
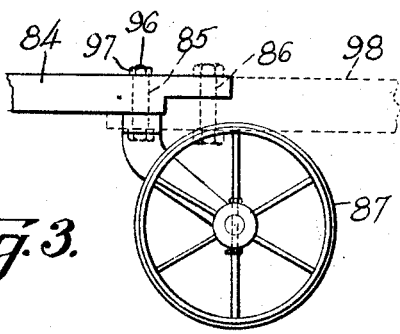
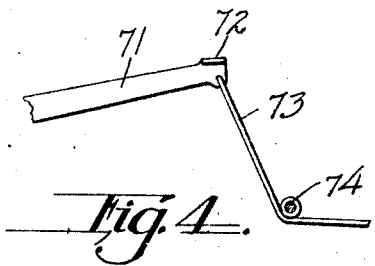
INVENTOR
Howard M. Sweet.
BY his ATTORNEY

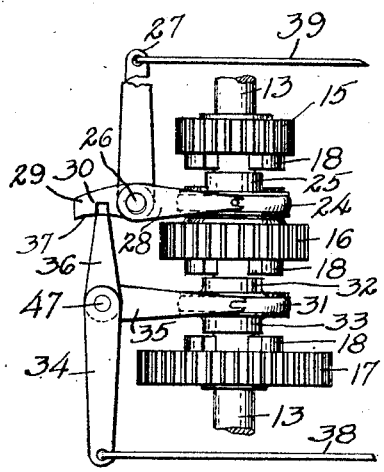
Fig. 5.
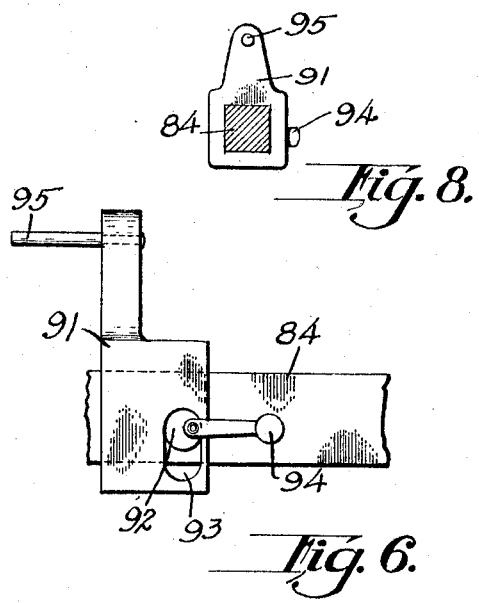
Fig. 8.
Fig. 6.
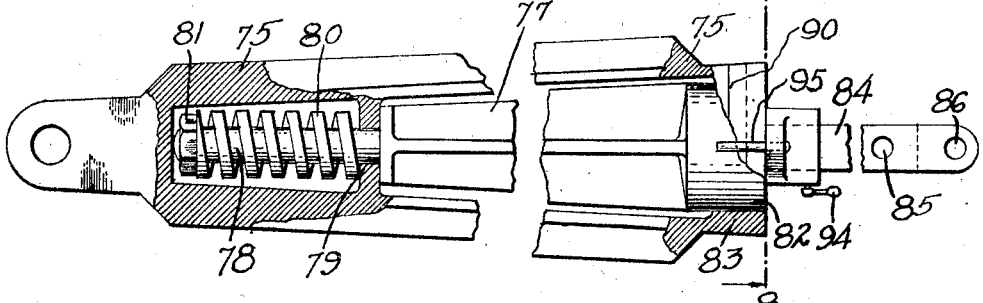
Fig. 7.

Oct. 20, 1925.

H. M. SWEET

LINE DRIVE TRACTOR

Filed April 6, 1921

INVENTOR
Howard M. Sweet
BY his ATTORNEY

Patented Oct. 20, 1925.

1,558,311

UNITED STATES PATENT OFFICE.

HOWARD M. SWEET, OF DETROIT, MICHIGAN, ASSIGNOR, BY DIRECT AND MESNE ASSIGNMENTS, TO REX TRACTOR CO., OF DETROIT, MICHIGAN, A CORPORATION OF MICHIGAN.

LINE-DRIVE TRACTOR.

Application filed April 6, 1921. Serial No. 459,138.

*To all whom it may concern:*

Be it known that I, HOWARD M. SWEET, a citizen of the United States, residing at Detroit, county of Wayne, State of Michigan, have invented a certain new and useful Improvement in Line-Drive Tractors, and declare the following to be a full, clear, and exact description of the same, such as will enable others skilled in the art to which it pertains to make and use the same, reference being had to the accompanying drawings, which form a part of this specification.

This invention relates to tractors more particularly of the two-wheel type and adapted to be operated by control lines. One of the particular objects of the invention is to provide a tractor of very simple construction which may be operated by control lines from a vehicle drawn by the tractor, or by control parts on the tractor proper. Another object of the invention is to provide a tractor in which the steering of the tractor is accomplished by driving one or the other of the two wheels of the tractor separately, the wheel which is not driven acting as a pivot and the driven wheel turning about on the said pivot. A further object of the invention is to provide a tractor having a draw bar which may be elongated against the tension of the spring so that shocks occurring to the draw bar are yieldingly resisted. A still further object of the invention is to provide a tractor of the character described having a draw bar consisting of two parts, a stationary part pivoted to the frame to swing in a vertical axis and a rotatable part mounted in the stationary part to rotate on a horizontal axis to which the vehicle to be drawn is secured. A novel feature of the invention is involved in the construction of the transmission in which the gear connecting means is adapted to be controlled by lines and in which it is impossible to connect more than one gear at a time to drive the tractor. These objects and the several novel features of the invention are hereinafter more fully described and claimed and the preferred form of construction by which these objects are attained is shown in the accompanying drawings in which—

Fig. 2 is a side elevation of the tractor.

Fig. 3 is a view showing the manner of securing a trailing wheel to the draw bar to support the rear end of the tractor, when the tractor is driven alone.

Fig. 4 is a view of the means for controlling the clutch for the power plant.

Fig. 5 is a detail of the gear connecting mechanism.

Fig. 6 is a view of the means for locking the draw bar in position in relation to the frame.

Fig. 7 is a view partly in section of the draw bar.

Fig. 8 is a section taken on line 8—8 of Fig. 7.

Figure 1:
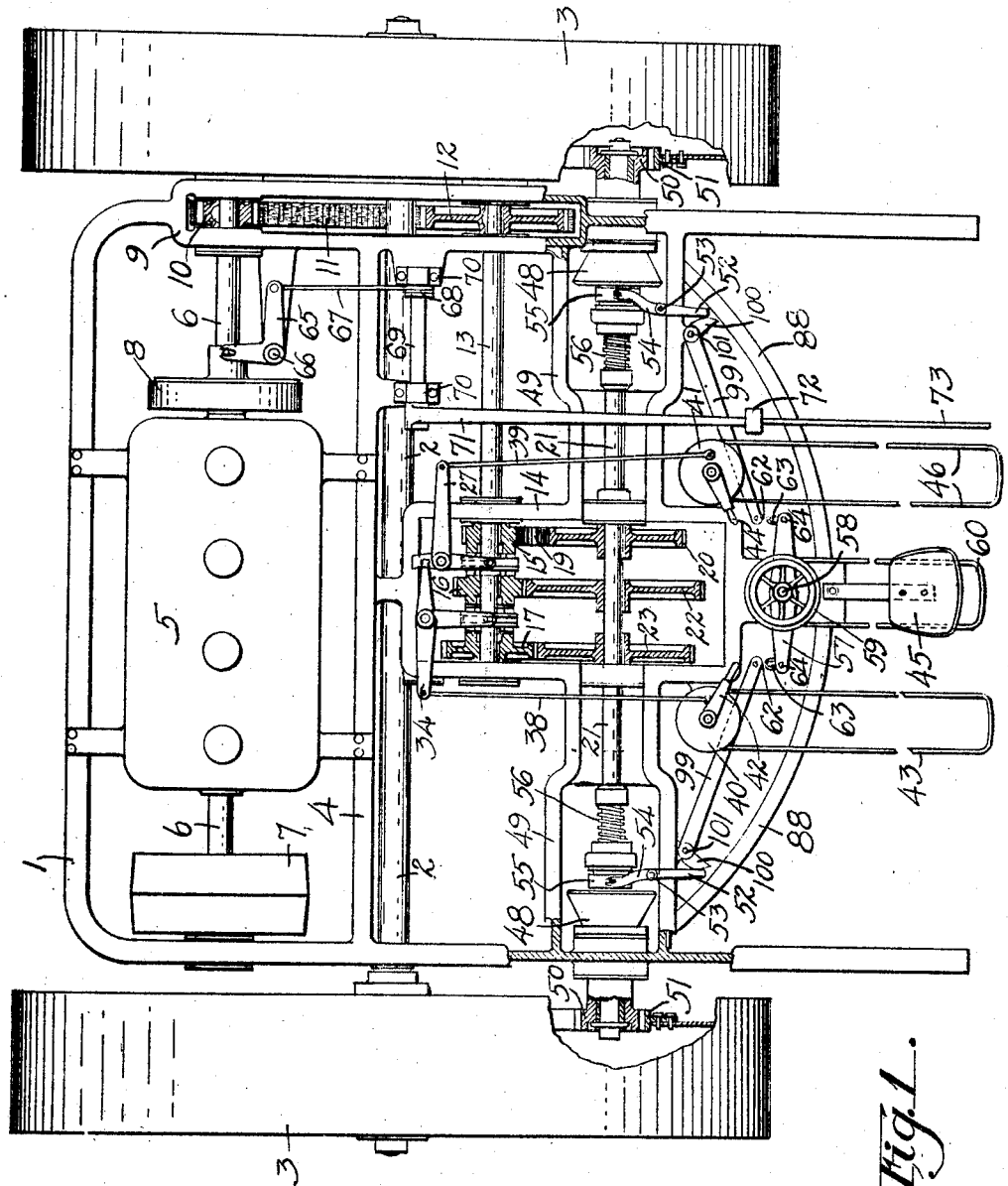
Fig. 1 is a plan view of the tractor, the transmission cover being removed to show the mechanism.

As shown in Fig. 1 the tractor is provided with a frame 1 preferably of I-beam construction which carries the axle 2 for the tractor wheels 3. This frame member 1 is provided with a transverse support 4, the internal combustion engine 5 being mounted on the said support and frame 1 as shown more particularly in Fig. 1. The internal combustion engine 5 is provided with a crank shaft 6, a belt pulley 7 being provided at one end of the crank shaft and a clutch 8 preferably of sufficient weight to act as a fly wheel, is provided on the opposite end of the crank shaft. The crank shaft 6 extends into a casing 9, which in Fig. 1 is shown with the cover removed, and secured to the end of the shaft 6 within the casing 9 is a small sprocket 10. This sprocket 10 is connected by means of a chain 11 to a large sprocket 12 on a counter shaft 13 which extends from the casing 9 into the transmission casing 14 as shown in Fig. 1. Rotatably mounted on this counter shaft 13 within the transmission casing 14 is a series of gears 15, 16 and 17 each being provided with a clutch face 18 on one face thereof as shown more particularly in Fig. 5. The gear 15 meshes with an idler gear 19 shown in Fig. 1 which is in mesh with the gear 20 secured to the drive shaft 21. The gear 16 meshes with the gear 22 and the gear 17 meshes with the gear 23 both secured to the drive shaft 21. Secured to the shaft 13 is a clutch member 24 provided with clutch face 25 adapted to be brought to engagement with the clutch face 18 on the side of the reverse gear 15. Pivoted on the rod 26 secured in the transmission casing is a rocker arm 27 having a yoke 28 extending at a right angle thereto which is adapted to move the member 24 into and out of engagement with the clutch face 18 on the side of the gear 15. The rocker arm 27 is also provided with an extending portion 29 having a notch 30 therein for a purpose hereinafter described. As shown more particularly in Fig. 5, also secured to the shaft 13 between the gears 16 and 17 is a clutch member 31 provided with a clutch face 32 on one side adapted to mesh with the clutch face 18 of the gear 16 and having a clutch face 33 on the opposite side adapted to be brought to mesh with the clutch face 18 on the side of the gear 17, the member 31 in Fig. 5 being shown in the neutral position. To operate the member 31 a rocker arm 34 is provided having a yoke end 35 engaging over and controlling the member 31, an extending portion 36 being also provided adapted to travel against the curved face 37 of the member 29 when the rocker arm 34 is moved. A rod 38 is connected to the lever 34 and the rod 39 is connected to the lever 27 providing a means for operating the said levers. The opposite end of the rod 38 is connected eccentrically to a wheel 40 and the opposite end of the rod 39 is connected in the same manner to a wheel 41. The wheel 40 may be controlled by a handle 42 or a continuous line 43 secured thereto and the wheel 41 may be controlled by a handle 44 from the operator's seat 45 or by a continuous line 46 from the vehicle drawn by the tractor. Upon rotation of the wheel 40, shown in Fig. 1, in a clockwise direction the rod 38 is drawn to the rear which by means of a rocker arm 34 rotating on the pivot 47 moves the member 31 to move the teeth 32 into engagement with the teeth 18 on the side of the gear 16. This causes the gear 16 to rotate with the shaft 13 and drive the tractor at low speed through the gear 22 in mesh therewith. To shift the speed changing mechanism to high gear the wheel 40 is rotated by means of the handle 42 or lines 43 in a counter clockwise direction which moves the rod 38 forward thereby moving the rocker arm 34 on its pivot and by means of the arm 35 moves the member 31 to move the teeth 33 into mesh with the teeth 18 on the side of the gear 17 at the same time withdrawing the teeth 32 from the teeth 18 in the side of the gear 16. As the member 31 is secured to the shaft 13 the gear 17 is caused to rotate therewith and by means of the gear 23, which is in mesh with the gear 17, the tractor is driven at high speed.

To reverse the tractor the wheel 40 is turned to position the member 31 in the neutral position shown in Fig. 5 at which time the end of the arm 36 is opposite the notch 30 in the arm 29. At this time by turning the wheel 41 in a counter clockwise direction the lever 27 is turned in a counter clockwise direction and the arm 29 is moved so that the notch 30 engages over the end of the arm 36 thus preventing movement of the arm 36 and rocker arm 34 in relation thereto. When the arm 27 is thus moved the teeth 25 of the member 24 are moved into engagement with the teeth 18 of the gear 15 which secures the gear 15 to the shaft 13 and drives the tractor in reverse through the idler gear 19 and gear 20. It is to be noted that due to the engagement of the notch 30 over the arm 36 the member 31 cannot be moved to engagement with the teeth 18 and thus it is practically impossible to connect more than one gear at a time to drive the tractor. It will also be noted that when either of the forward speed gears are in engagement the reverse gear cannot be brought to engagement due to the end of the arm 36 riding against the face 37 of the member 29, the object of the device being to prevent the possibility of engaging more than one gear at a time.

Figure 9:
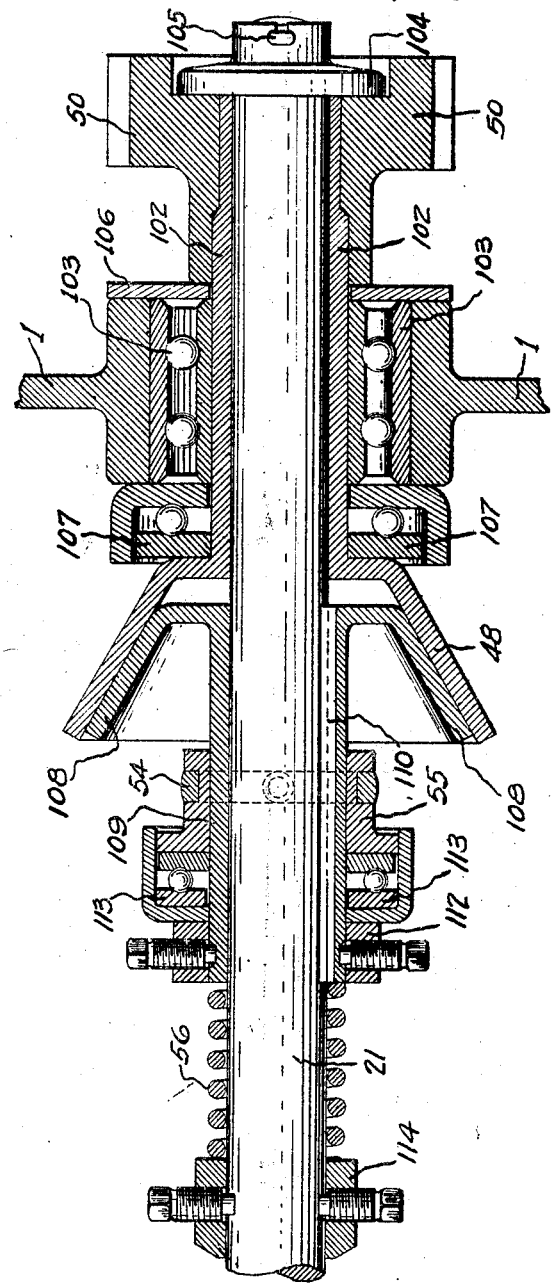
Fig. 9 is a section through the drive clutches on one end of the shaft and parts adjacent thereto.

The shaft 21 is provided with a cone clutch 48 at each end thereof, a casing 49 being provided on each side of the casing 14 and formed integrally therewith to enclose the shaft 21 and clutches and provide a supporting frame member. These clutches 48 are adapted to connect the drive shaft 21 with or disconnect it from driving relationship with the pinion 50 on each side. As shown in Fig. 9 the outer clutch member 48 is provided with a tubular portion 102 which is rotatable on the shaft 21 and extends through the bearings 103 in the tractor frame 1. The pinion 50 is secured to the outer end of this member 102 as shown and a collar or nut 104 is secured to the end of the shaft by the pin 105 and is rotatable within the pinion 50. A spacer or flat bearing member 106 is provided between the pinion and adjacent portion of the frame and a thrust bearing 107 is provided between the outer clutch member 48 and opposite side of the frame member 1. The inner companion clutch member 108 is also provided having a tubular portion 109 which is keyed to the shaft by the key 110, the clutch member 108 being movable longitudinally of the shaft on the said key. A collar member 55 is provided which is rotatable on the tubular portion 109 and the yoke 54 engages in the said collar as shown whereby the collar may be moved to engage or disengage the clutch members. An additional collar 112 is secured to the tubular portion 109 and a thrust bearing is mounted between the collars 55 and 112. A collar 114 is secured to the shaft 21 in spaced relation with the end of the tubular member 109 and a coiled spring 56 interposed on the shaft between the collar 114 and the end of the tubular portion 109. Both clutch members and adjacent parts on opposite ends of the shaft 21 are identically similar and when the collar 55 is moved toward the left of Fig. 9 against the tension of the spring 56 by the yoke 54 the clutch member 108 is disengaged from the clutch member 48. It will be noted that when the clutch member at the right of Fig. 1 is moved toward the left against the tension of the spring 56 the said spring tends to move the shaft 21 to the left which causes the clutch members on the left to engage more tightly. The same is true when the clutch member 48 is withdrawn against the tension of the spring 56 at the left of Fig. 2 which causes the clutch member at the right to more tightly engage. It is to be noted that with this clutch device that, though the tension of the spring 56 is necessarily great there is no thrust or resistance to rotation of the parts, the parts between the collar 114 and member 104 rotating together as a unit and the thrust bearing 107 only being brought into use as a thrust bearing when one or the other of the clutches is disengaged under which condition the tension of the spring 56 tends to force the shaft 21 in one direction or the other longitudinally of its axis. The pinions 50 are continuously in mesh with an internally toothed ring gear 51 secured to each wheel 3 as shown more particularly in Fig. 2. The mechanism for operating the clutches consists of a lever 52 pivoted to the casing 49 at 53. The lever 52 is provided with a yoke end 54 connected to the collar 55 of each clutch, a spring 56 being interposed on the shaft 21 at each end yieldingly holding the clutch members in engagement. A yoke 57 is pivoted on a shaft 58 which is controlled by hand by the hand wheel 59 or by the continuous line 60 connected to the wheel 61 which is secured to the shaft 58 as shown more particularly in Fig. 2. Each end of the yoke 57 is connected to an adjacent lever 99 by means of a member 62, each member 62 being provided with a slot 63 in which a pin 64 at each end of the yoke 57 is adapted to ride. Each lever 99 is provided with a cam end 100 which is in engagement with the lever end 52 and is pivoted to the tractor frame at 101 as shown in Fig. 1. Upon turning the yoke 57 in a clockwise direction by the hand wheel 59 or by the lines 60 the member 62 at the right of Fig. 1 is drawn toward the rear which moves the corresponding lever 99 to the rear and through the cam end 100 operates the lever 52 at the right of Fig. 1 to disengage the corresponding clutch 48. When this clutch 48 has been disengaged the wheel 3 at the right of Fig. 1 remains stationary while the wheel 3 at the left of Fig. 1 is driven thus turning the tractor about on the wheel 3 at the right of Fig. 1 as a pivot. On account of the slot 63 in the member 62 only one of the clutches 48 may be disengaged at a time by turning the yoke 57. For instance, upon turning the yoke 57 in a clockwise direction the pin 64 pulls down on the member 62 at the right of Fig. 1 while the pin 64 at the left travels upward in the slot 63 of the member 62 without actuating any of the parts at the left of the said figure. Upon counter clockwise rotation of the yoke the clutch 48 at the left of Fig. 1 is disengaged which causes the tractor to turn to the left, the parts at the right of Fig. 1 remaining in the engaged position. To operate the motor clutch 8 a rocker arm 65 is provided rotatably mounted on a pivot 66 supported on the tractor frame. Connected to the rocker arm 65 is a rod 67 which at the opposite end is connected to an arm 68 extending downwardly from the shaft 69. This shaft 69 is rotatably mounted in bearings 70 therefor and a long lever 71 is provided secured to the end of the shaft 69 and having a foot pedal 72 on the end thereof which may be depressed by the operator to disengage the clutch 8 as will be readily understood. As shown in Fig. 2 this lever 71 extends upwardly at an angle and in order to control this lever by a line the line 73 is connected thereto as shown more particularly in Fig. 4, the line being passed around a pulley 74 on the tractor frame so that the lever 71 is depressed upon pulling the line 73 and is returned to position by a spring (not here shown). As shown in Fig. 2 a draw bar 75 is pivoted to the vehicle frame beneath the center at 76 to swing in a horizontal plane, the portion 75 being a casing for the inner portion 77 of the draw bar as shown more particularly in Fig. 7. The portion 77 is provided with an extending shaft end 78 which is rotatably mounted in a partition 79 providing a bearing therefor. About the shaft 78 is a stiff coiled spring 80 which is compressed between the nut 81 and bearing partition 79. The member 77 is provided with a rounded portion 82 at the opposite end thereof fitting in a bearing 83 therefor in the member 75, the remaining portion 84 of the draw bar 77 extending to the rear as shown in Figs. 2, 3 and 7 and providing a means for connecting a trailing device to the tractor. As shown in Figs. 3 and 7 the portion 84 of the draw bar 77 is provided with two apertures 85 and 86 by means of which a pair of trailing wheels 87 may be secured to the part 84 when the tractor is to be driven alone or, by removing the wheels 87 the tongue of a vehicle to be drawn by the tractor may be secured thereto as shown more particularly in dotted lines in Fig. 3. An arcuate member 88 is secured beneath the tractor frame as shown more particularly in Figs. 1 and 2, the axis of the arcuate member 88 coinciding with the pivot 76 and this member 88 is provided with a flange 89 over which a lug 90 of the outer draw bar part 75 engages. By this means the draw bar is supported during its arcuate movement through a horizontal plane. As shown more particularly in Fig. 6 a member 91 is mounted on the part 84 and is movable longitudinally thereof by a cam 92 riding in the opening 93. This cam is movable by a weighted handle 94 and the member 91 is provided with a pin 95 in the upper end thereof adapted to fit in an aperture in the center of the arcuate guide member 88 (not here shown). When the tractor is to be driven alone the draw bar is positioned centrally of the tractor and by moving the handle 94 to the position shown in Fig. 6 the pin 95 is inserted in the aperture therefor in the member 88 thus preventing the draw bar from swinging on the vertical axis 76 and holding the part 84 from rotating in the outer draw bar part 75. The pin 95 is made of sufficient length so that a rearward movement of the part 84 against the tension of the spring 80 will not draw the pin from the aperture therefor. When the draw bar has been thus secured in place the bolt end 96 for the wheels 87 shown in Fig. 3 is inserted through the aperture 85 and the nut 97 is threaded thereon which secures the wheels 87 in place on the draw bar and yet allows the same to turn by means of the portion 96 being rotatably mounted in the aperture 85. When it is desired to draw a vehicle by the tractor the handle 94, shown in Fig. 6, is given a half turn in a counter clockwise direction which moves the member 91 by means of the cam 92 backward on the member 84 thus withdrawing the pin 95 from the aperture therefor in the arcuate member 88. The tongue 98 of the trailing vehicle shown more particularly in dotted lines in Fig. 3, is then bolted to the member 84 by passing bolts through apertures in the tongue and through the apertures 85 and 86 in the part 84 which makes the draw bar and tongue of the vehicle practically one continuous unit, the spring 80 taking up any shocks to the draw bar through the vehicle. By this arrangement the tractor may turn in relation to the vehicle as the draw bar will travel over the arcuate member 88 and the vehicle and tractor may twist longitudinally in relation one to the other by means of the members 84 and 77 being rotatable within the outer draw bar part 75. By this arrangement the driver may steer the tractor, make the different gear changes and engage and disengage the engine clutch either by means of lines from the trailing vehicle or from the seat on the tractor by means of the control parts.

From the foregoing description it becomes evident that the device is very efficient in operation, of few parts in comparison to other tractors of this type, is strong and positive in operation and provides a device which accomplishes the objects desired.

Having thus fully described my invention, its utility and mode of operation, what I claim and desire to secure by Letters Patent of the United States is—

1. In a tractor, means for controlling the operating parts thereof comprising the combination with driving wheels, frame, power plant and transmission mechanism, of a jack shaft operatively connected with the power plant, a clutch member at each end of the jack shaft for connecting or disconnecting the same with the respective driving wheels, levers for operating the clutch devices, transmission mechanism including shiftable members for causing a forward or reverse movement of the tractor, a hand lever for the forward and a hand lever for the reverse shift devices, a wheel connected with each lever, a pair of lines for turning each wheel from a distance and thereby move the respective lever to actuate the shift devices, mechanism for operating each of the clutches including a rotatable shaft, a lever thereon for each clutch device adapted to actuate the same upon turning in one direction only, a wheel on the said shaft, and a pair of lines for the wheel adapted to turn the same in one direction or the other.

2. In a tractor, the combination with the driving wheels, power plant and transmission mechanism thereof, of a jack shaft operatively connected with the power plant, means for connecting or disconnecting the power plant therewith, a clutch member at each end of the jack shaft for connecting or disconnecting the same with the respective driving wheel, means for operating the said jack shaft clutches, a transmission mechanism interposed between the power plant and jack shaft, said transmission mechanism including shiftable devices for causing a forward or reverse movement of the tractor, a hand lever for operating the forward shift device and a similar hand lever for operating the reverse shift device, a wheel connected with each hand lever, a pair of lines for each wheel for turning the same from a distance to cause movement of the respective hand lever and thereby actuate the respective shift device.

3. In a tractor, the combination with a power plant and a jack shaft, of power transmitting means interposed therebetween, said mechanism including a series of gears of different sizes on the jack shaft and gears complemental thereto and in mesh therewith, each of the said last named gears having a clutch member connected therewith, complemental clutch members movable to engage the gear clutch members, a pivoted lever for actuating each movable clutch member, means preventing operation of any lever to shift the respective clutch member to engage a gear when one lever has been so operated, either lever being operable when the shiftable members are in neutral position, a rod connected with each lever, a vertical shaft, a wheel thereon to which the opposite end of the respective rod is connected, a hand lever for turning each of the shafts, and a line for each wheel for turning the same from a distance, the said rod in each instance providing a means whereby the respective shift lever may be moved in either possible direction.

In testimony whereof, I sign this specification.

HOWARD M. SWEET.